US009930986B2

(12) United States Patent
Arai et al.

(10) Patent No.: US 9,930,986 B2
(45) Date of Patent: Apr. 3, 2018

(54) VACUUM ELECTRIC COOKER

(71) Applicant: TESCOM Co., Ltd., Sibuya-ku, Tokyo (JP)

(72) Inventors: Rie Arai, Tokyo (JP); Maro Tokushige, Tokyo (JP); Sachio Tsukuda, Tokyo (JP); Kenji Kakuta, Tokyo (JP); Fumiyasu Maruyama, Tokyo (JP)

(73) Assignee: TESCOM Co., Ltd., Sibuya-ku, Tokyo (JP)

(*) Notice: Subject to any disclaimer, the term of this patent is extended or adjusted under 35 U.S.C. 154(b) by 1028 days.

(21) Appl. No.: 14/045,135

(22) Filed: Oct. 3, 2013

(65) Prior Publication Data

US 2014/0137750 A1 May 22, 2014

(30) Foreign Application Priority Data

Oct. 5, 2012 (JP) ................. 2012-222634

(51) Int. Cl.
*A47J 36/00* (2006.01)
*A23L 1/025* (2006.01)
(Continued)

(52) U.S. Cl.
CPC ........... *A47J 27/002* (2013.01); *A47J 27/004* (2013.01); *A47J 27/04* (2013.01); *A47J 43/046* (2013.01); *A47J 43/0716* (2013.01)

(58) Field of Classification Search
CPC ........ A47J 27/002; A47J 27/004; A47J 27/04; A47J 43/046; A47J 43/0716
(Continued)

(56) References Cited

U.S. PATENT DOCUMENTS 4,505,593 A   3/1985   Miller et al.
4,863,278 A   9/1989   Otto
(Continued)

FOREIGN PATENT DOCUMENTS

CN   102631153 A   8/2012
JP   10-179427      7/1998
(Continued)

OTHER PUBLICATIONS

Japanese Office Action with English Translation (2012-2226334) (6 pages—dated Jul. 15, 2014).
(Continued)

*Primary Examiner* — Omar Flores Sanchez
(74) *Attorney, Agent, or Firm* — Renner, Kenner, Greive, Bobak, Taylor & Weber

(57) ABSTRACT

The present invention has an object to provide a vacuum electric cooker as can be easily worked by an operator and as can minimize a stress to be applied to the container. The vacuum electric cooker of this invention includes a cooker body having a horizontal base and a stand section, a cooker container including a cooking tool, a cover member having a discharge nozzle, a connecting arm having a base end attached to the stand section as to rock in a vertical plane between a horizontal active position and a vertical inactive position. A connecting nozzle is attached to the connecting arm and connected to the discharge nozzle when the connecting arm is at the active position. A vacuum pump is disposed in the cooker body, and a tube is connected to the vacuum pump and the connecting nozzle.

14 Claims, 16 Drawing Sheets

(51) Int. Cl.
*A47J 27/00* (2006.01)
*A47J 43/046* (2006.01)
*A47J 43/07* (2006.01)
*A47J 27/04* (2006.01)

(58) Field of Classification Search
USPC .................................................. 99/328, 348
See application file for complete search history.

(56) References Cited

U.S. PATENT DOCUMENTS

| | | | | |
|---|---|---|---|---|
| 5,363,746 | A | * 11/1994 | Gordon | A23G 9/12 366/145 |
| 5,800,852 | A | * 9/1998 | Levinson | A23F 3/18 426/234 |
| 2002/0178932 | A1 | * 12/2002 | Cai | A47J 27/04 99/516 |
| 2012/0114815 | A1 | * 5/2012 | Wolfe | A47J 36/165 426/231 |
| 2014/0373729 | A1 | * 12/2014 | Kim | A47J 27/004 99/403 |

FOREIGN PATENT DOCUMENTS

| | | |
|---|---|---|
| JP | 2004-105488 | 4/2004 |
| JP | 2005-7035 A | 1/2005 |
| JP | 2005-253355 A | 9/2005 |
| JP | 2006-149499 | 6/2006 |
| JP | 2008-206907 | 9/2008 |
| JP | 2015-8779 A | 1/2015 |
| WO | WO 2008/029976 A1 | 3/2008 |

OTHER PUBLICATIONS

European Search Report (Application No. 16171520.6) (8 pages—dated May 10, 2016).
European Search Report (Application No. 13187436.4) (7 pages—dated Jun. 3, 2014).
Chinese Office Action (Application No. 201310461249.8), (7 pages, dated Dec. 9, 2015).
English Translation of Chinese Office Action (Application No. 201310461249.8), (8 pages, undated).
Chinese Office Action (Application No. 201310461249.8), (4 pages, dated Jun. 1, 2016).
English Translation of Chinese Office Action (Application No. 201310461249.8), (5 pages, undated).

* cited by examiner

VACUUM ELECTRIC COOKER

CROSS-REFERENCE TO RELATED APPLICATION

This application is based upon and claims benefit of priority from the Japanese Patent Application No. 2012-222634 filed on Oct. 5, 2012, which is incorporated herein by reference in its entirety.

TECHNICAL FIELD

The present invention relates to a vacuum electric cooker and, more particularly, to a vacuum electric cooker for cutting, pulverizing and agitating a food material while the inside of a container is being evacuated.

BACKGROUND ART

While an inclination to a healthy life for foods is being intensified in recent years, an interest is being raised in the vegetable juices or soups, through which many vegetables can be easily eaten. Another interest is also heightened to an electric cooker such as the juicer or mixer, by which those vegetable juices or soups can be home-made.

In the prior art, the electric cooker having the functions to cut, crush and agitate the foods (or food materials) is well known as the mixer (as referred to Patent Document 1, for example). There is also known the soup cooker which is provided with the heating-warming means in addition to food (or food-material) cutting, pulverizing and agitating functions, and can cook soup according to a cooking program (as referred to Patent Document 2, for example).

Even if a fresh juice is made by the aforementioned mixer of the conventional structure, however, the juice has its food components progressed in decomposition and oxidation as the time elapses, so that the nourishing components do nothing but decrease.

In Japanese Patent Laid-Open No. 2008-206907, therefore, there has been proposed the electric cooker which is enabled to prevent the oxidation of the nourishing components and to increase the same components thereby to prepare soups of high nutrition values.

The electric cooker, as proposed in the Japanese Patent Laid-Open No. 2008-206907, comprises: a body having a motor mounted therein; a container removably mounted on said body; a cutter connected, when mounted on the body of said container, to said motor so that it rotates to cut a food in said container; heating means for heating the inside of said container; a cover for covering said container; temperature detecting means for detecting the temperature in said container; and control means for performing the control of said heating means on the basis of a signal of said temperature detecting means, wherein said control means is provided in its cooking program with a suction stroke of evacuating the pressure in said container into a low-enzyme state and an enzyme reaction step of promoting the enzyme reaction of the food.

Here, the aforementioned suction stroke is performed by suction means having a main component of a suction pump arranged in a cover, and this suction means comprises: a suction pump; a suction port for sucking the air in a container; a discharge port for discharging the sucked air to the outside of the container; a communication passage for connecting the suction port and the discharge port; and a change-over valve for changing the communication passage openably, wherein the suction means operates at the suction stroke to suck the air from the inside of the container thereby to establish a low-oxygen state.

The electric cooker, as proposed in Japanese Patent Laid-Open No. 2008-206907, is enabled to establish a low-oxygen state in a container by the aforementioned structure so that it can cook such a soup automatically as prevents the oxidations and deteriorations of nutritious components. Because of the large structure and heavy weight of that suction pump, however, a cover mounting the pump thereon is enlarged not only in the structure but also in the weight thereof. Thus, said cover becomes hard for the works of the worker and causes serious stresses on the container so that it causes a breakage of the container in the worst case.

PRIOR ART DOCUMENTS

Patent Document 1

Japanese Patent Laid-Open No. 10-179427

Patent Document 2

Japanese Patent Laid-Open No. 2006-149499

Patent Document 3

Japanese Patent Laid-Open No. 2008-206907

DISCLOSURE OF THE INVENTION

Thus, the present invention has an object to provide a vacuum electric cooker which is equipped with such a cover for a container as is easy for the work of an operator and as can minimize a stress to be applied to the container.

Means for Solving the Problems

The aforementioned object can be achieved by a vacuum electric cooker having the following constitutions (1) to (13) according to the invention.

(1)

A vacuum electric cooker characterized by comprising: a cooker body including a horizontal base and a stand section extending vertically upward from the rear edge of that horizontal base and having a motor mounted therein; a cooker container including a cooking tool adapted to be driven by said motor, and removably mounted on the horizontal base of said cooker body; a cover member having a discharge nozzle for covering said cooker container; a connecting arm having a base end so attached to the vicinity of the upper end of said stand section as to rock in a vertical plane between a substantially horizontal active position and a substantially vertical inactive position; a connecting nozzle attached to the leading end of said connecting arm and connected air-tightly to said discharge nozzle when said connecting arm is at the active position; holding means for holding the state, in which said connecting nozzle is hermetically connected to said discharge nozzle; a vacuum pump disposed in said cooker body; and an air tube connected at one end to said vacuum pump, extending therefrom within the stand section and the connecting arm and connected at the other end to said connecting nozzle.

(2)

A vacuum electric cooker as set forth in the aforementioned (1), wherein said connecting arm is biased in the direction to said inactive position by biasing means having a spring.

(3)

A vacuum electric cooker as set forth in the aforementioned (1) or (2), wherein said holding means is arranged in said connecting arm.

(4)

A vacuum electric cooker as set forth in any of the aforementioned (1) to (3), wherein releasing means adapted to be operated by an operator for releasing the active state of said holding means is mounted on said connecting arm.

(5)

A vacuum electric cooker as set forth in any of the aforementioned (1) to (4), wherein the gas-tightness of the connection between said connecting nozzle and said discharge nozzle is achieved by a sealer mounted on the lower end of said connecting nozzle and/or the upper end of said discharge nozzle.

(6)

A vacuum electric cooker as set forth in any of the aforementioned (1) to (5), further comprising a trap member having a cup shape and removably attached to the lower side of that portion of said cover member, which is equipped with said discharge nozzle, so that the air flow from the cooker container flows through that trap member to the side of the discharge nozzle, wherein said trap member is equipped with air-flow control means for preventing the air flow from proceeding directly toward the discharge nozzle, so that a material for cooking accompanied by the air flow may be received on the bottom of said trap member.

(7)

A vacuum electric cooker as set forth in the aforementioned (6), wherein the air-flow control means includes: a communication port formed in the bottom of said trap member for causing the air flow from the cooker container to hit the lower face of the cover member around said discharge nozzle; and an air-flow buffering tube extending vertically downward from the lower face of said cover member around the arranged portion of said discharge nozzle, for preventing the air flow having hit the lower face of said cover member from going directly to the discharge nozzle.

(8)

A vacuum electric cooker as set forth in any of the aforementioned (1) to (7), wherein said cover member includes a sealer for blocking the entry of air into the cooker container, when said cover member is mounted on the cooker container, from between said cover member and the upper wall of the cooker container.

(9)

A vacuum electric cooker as set forth in any of the aforementioned (1) to (8), further comprising: control means for controlling said motor and said vacuum pump; and pressure detecting means connected with said control means for metering the degree of vacuum in said cooker container, wherein said control means activates said vacuum pump firstly at the start of the vacuum electric cooker, to evacuate the inside of the cooker container, wherein said pressure detecting means sends a predetermined vacuum degree achievement signal to said control means, when the vacuum degree in the cooker container reaches a predetermined vacuum degree, so that said control means having received said signal stops said vacuum pump and starts said motor, wherein said pressure detecting means sends a vacuum drop signal to said control means, when the vacuum degree in the cooker container drops, during the action of said motor, to a second predetermined vacuum degree lower than said first predetermined vacuum degree, and wherein said control means having received said vacuum degree drop signal activates said vacuum pump thereby to raise the vacuum degree of said cooker container to said first predetermined vacuum degree.

(10)

A vacuum electric cooker as set forth in any of the aforementioned (1) to (9), further comprising a vacuum-preservation container including a vacuum-preservation container body; and a preservation container cover having a discharge nozzle of a structure similar to that of the discharge nozzle of said cover member, wherein a check valve for passing the air flow only from the vacuum-preservation container body toward the discharge nozzle is connected to the discharge nozzle, and wherein said vacuum-preservation container is made so high that the discharge nozzle thereof can be hermetically connected to the connecting nozzle of said connecting arm when placed on the horizontal base of said cooker body while the cooker container cover is placed on said vacuum-preservation container.

(11)

A vacuum electric cooker as set forth in the aforementioned (10), wherein said preservation container cover includes air-tightness releasing means for releasing the gas-tightness in the vacuum-preservation container by the operation of the operator.

(12)

A vacuum electric cooker as set forth in any of the aforementioned (1) to (11), further comprising an accessory vacuum tube provided at its one end with an discharge nozzle having a structure similar to that of the discharge nozzle of said cover member.

(13)

A vacuum electric cooker as set forth in the aforementioned (12), wherein said accessory vacuum tube is provided at its other end with a connecting nozzle having a structure similar to that of the connecting nozzle of said connecting arm.

Effects of the Invention

In the vacuum electric cooker of the invention, the bulky and heavy vacuum pump is arranged not in the cover member but in the cooker body. As a result, the vacuum electric cooker can have its structure simplified and its weight reduced so that it can be easily used by the user and can reduce the stress on the container due to the cover.

In the electric cooker disclosed in the aforementioned Patent Laid-Open, the vacuum pump is disposed in the cover of the container and has its suction port opened directly in the lower cover face. If the discharge is performed by the suction pump at a cooking time, the material for cooking or liquid in the container enters the aforementioned suction port and degrades the function of the pump. As the case may be, a preset degree of vacuum cannot be acquired to leave the cooking itself incomplete. Moreover, a material for cooking or liquid may steal so deeply into the pump as to affect the internal parts of the pump adversely. In the worst case, the steal may become a cause for breaking the pump. On the other hand, the material or liquid having entered the inside of the pump may rot inside and flow back into the container thereby to establish an unsanitary state.

On the contrary, the vacuum electric cooker of the invention further comprises a trap member having a cup shape and adapted to be removably attached to the lower side of such portion of the aforementioned cover member as is equipped with the aforementioned discharge nozzle. This trap member is equipped with an air-flow buffering tube, which extends vertically downward for preventing the air from flowing toward the discharge nozzle, so that the material for cooking accompanied by the air flow is received on the bottom of the aforementioned trap member. As a result, neither the material for cooking nor the liquid enters the vacuum pump.

In the electric cooker disclosed in the aforementioned Patent Laid-Open, the vacuum pump thereof is activated before and after the cutter rotates and agitates but not while the cutter is rotating and agitating. The suction is performed before the cooking start and is then stopped for the rotational cooking. At this time, the material for cooking or liquid is agitated in the container during the rotational cooking, and it is anticipated that the air is caused to enter the container from the packing portion by the agitating energy or the pressure change of the inside of the container. Moreover, the air contained from the first time by the material for cooking is allowed by the agitation to flow out into the container. When the cooking is started, therefore, the degree of vacuum before the cooking cannot be maintained to make it difficult to keep the freshness of the material for cooking, as intended.

On the contrary, the vacuum electric cooker of the present invention further comprises: control means for controlling said motor and said vacuum pump; and pressure detecting means connected with said control means for metering the degree of vacuum in said cooker container, wherein said control means activates said vacuum pump firstly at the start of the vacuum electric cooker, to evacuate the inside of the cooker container, wherein said pressure detecting means sends a predetermined vacuum degree achievement signal to said control means, when the vacuum degree in the cooker container reaches a predetermined vacuum degree, so that said control means having received said signal stops said vacuum pump and starts said motor, wherein said pressure detecting means sends a vacuum drop signal to said control means, when the vacuum degree in the cooker container drops, during the action of said motor, to a second predetermined vacuum degree lower than said first predetermined vacuum degree, and wherein said control means having received said vacuum degree drop signal activates said vacuum pump thereby to raise the vacuum degree of said cooker container to said first predetermined vacuum degree. As a result, the predetermined vacuum degree can also be kept even during the cooking so that the freshness of the material for cooking can be satisfactorily kept.

BRIEF DESCRIPTION OF THE DRAWINGS

FIG. 16 A flow chart of a main routine showing the operation control of the vacuum electric cooker shown in FIG. 1 and so on.

MODE FOR CARRYING OUT THE INVENTION

Figure 1:
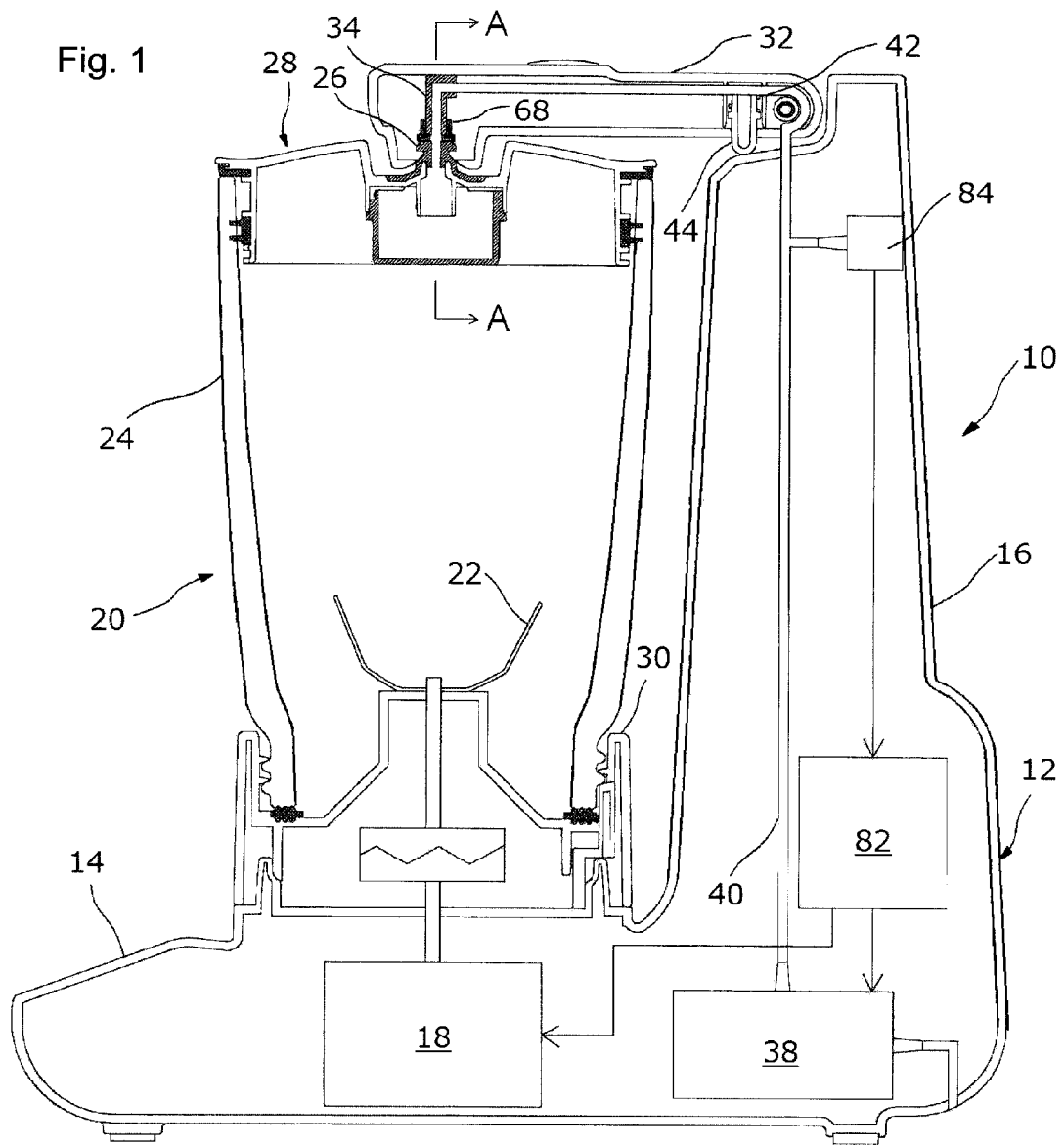
FIG. 1 A longitudinal section of a vacuum electric cooker according to an embodiment of the invention, and showing the state, in which the connecting arm is lowered.

The vacuum electric cooker according to a mode of embodiment of the present invention will be described in detail with reference to the accompanying drawings.

A vacuum electric cooker 10 according to the mode of embodiment of the invention is provided with a cooker body 12. This cooker body 12 is equipped with a horizontal base 14 and a stand section 16 extending vertically upward from the rear edge of that horizontal base 14. A motor 18 is built in the horizontal base 14 of the aforementioned cooker body 12.

The present vacuum electric cooker 10 is provided with a cooker container 20. This cooker container 20 is equipped with: a cooker container body 24 having a cooking tool 22 to be driven by the aforementioned motor 18; and a cover member 28 having a discharge nozzle 26 for covering the aforementioned cooker container body 24. The horizontal base 14 of the aforementioned cooker body 12 is equipped with an annular container base 30 for fitting and fixing the lower portion of the cooker container body 24 firmly. The aforementioned cooker container body 24 is firmly fitted and fixed on that container base 30 but can be freely removed therefrom.

Figure 2:
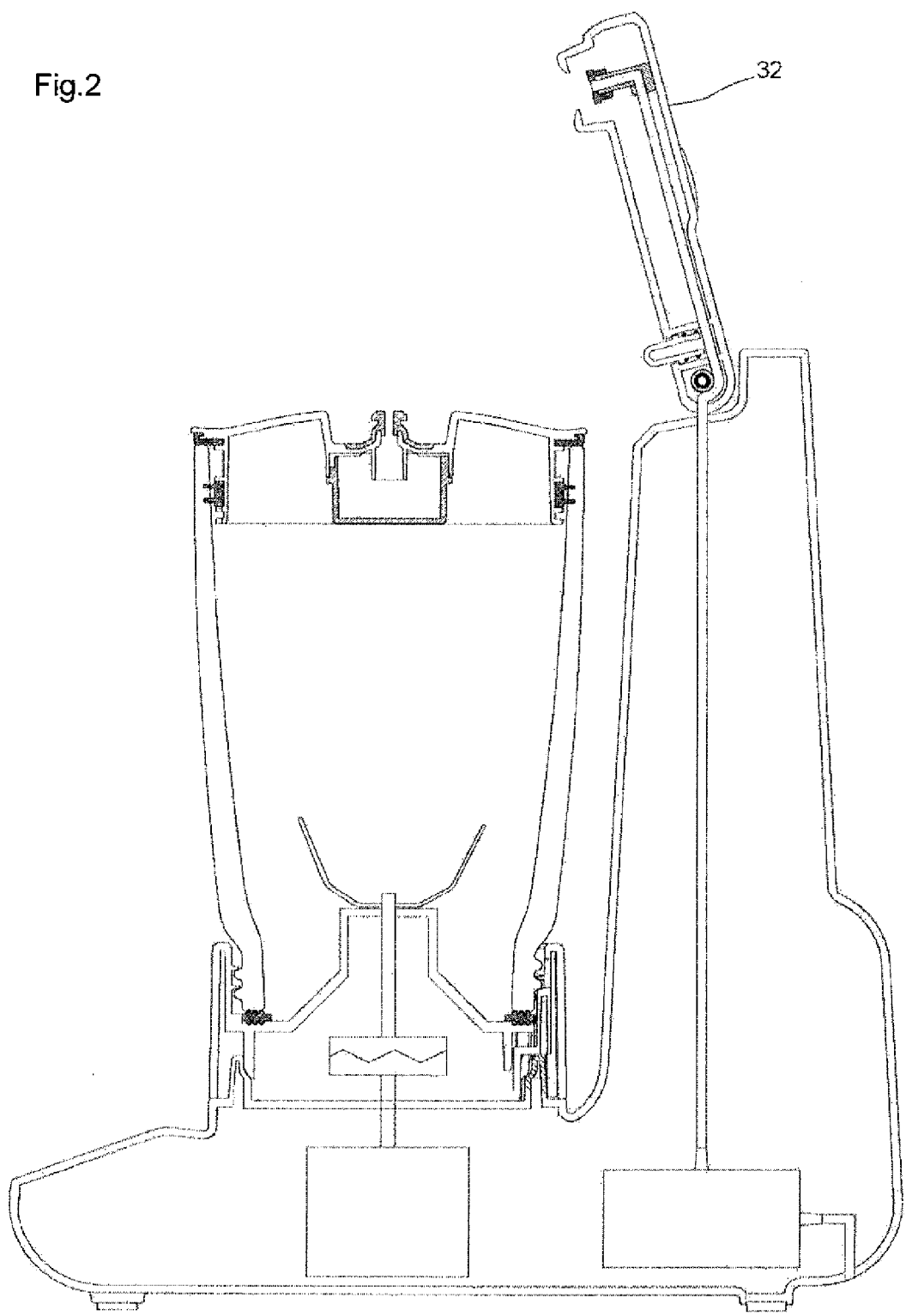
FIG. 2 A longitudinal section of a vacuum electric cooker according to the embodiment of the invention, and showing the state, in which the connecting arm is turned upward.

To the aforementioned cooker body 12 and in the vicinity of the upper end of the aforementioned stand section 16, there is so attached a connecting arm 32 at its base end as can rock in a vertical plane, so that it can take a substantially horizontal active position (FIG. 1) or a substantially vertical inactive position (FIG. 2).

To the leading end of the aforementioned connecting arm 32, there is attached a connecting nozzle 34, which is hermetically connected to the aforementioned discharge nozzle 26 when said connecting arm 32 is in the active position. The aforementioned connecting arm 32 is equipped at its leading end with holding means 36 (which is omitted in FIG. 1 and FIG. 2 and should be referred to FIG. 3 and so on) for holding the state of the gas-tight connection of the aforementioned connecting nozzle 34 to the aforementioned discharge nozzle 26).

In the aforementioned cooker body 12, there is disposed a vacuum pump 38, to which an air tube 40 is connected at its one end. This air tube 40 extends from the vacuum pump 38 through the insides of the stand section 16 of the cooker body 12 and the connecting arm 32 to the aforementioned connecting nozzle 34 so that it is connected at its other end to said connecting nozzle 34.

Therefore, the inside of the cooker container body 24 has communication with the aforementioned vacuum pump 38, when the connecting arm 32 takes the active position, as shown in FIG. 1, so that the connecting nozzle 34 of said connecting arm 32 is connected to the discharge nozzle 26 of the aforementioned cover member 28.

The aforementioned connecting arm 32 is provided at its base portion with biasing means 44 having a spring 42, by which the connecting arm 32 is biased in the direction toward the aforementioned inactive position by that biasing means 44.

Figure 4:
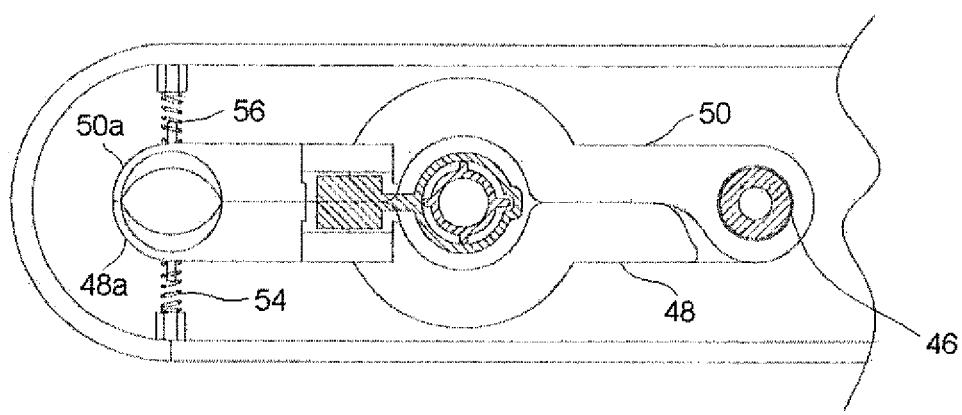
FIG. 4 A horizontal section showing a holding arm in a closed state.

In the aforementioned connecting arm 32, as shown in FIG. 4, there is fitted a pivot 46 which extends vertically. The aforementioned holding means 36 is equipped with a pair of holding arms 48 and 50 having their base ends hinged to that pivot 46. These holding arms 48 and 50 are integrally equipped at their leading ends with semi-annular holding pawls 48a and 50a, which enter an annular groove 52 formed in the circumference of the aforementioned discharge nozzle 26 thereby to keep the hermetic connection between the discharge nozzle 26 and the connecting nozzle 34.

The aforementioned holding arms 48 and 50 are enabled to pivot between active positions or closed positions, as shown in FIG. 3 to FIG. 8, and inactive positions or open positions, as shown in FIG. 9 to FIG. 14. Moreover, these holding arms 48 and 50 are biased in the aforementioned active positions by springs 54 and 56.

The aforementioned semi-annular holding pawls 48a and 50a are formed with sloping portions 48b and 50b at their lower portions. As the connecting arm 32 descends to the vicinity of the aforementioned active positions, the upper end of the discharge nozzle 26 rides on the sloping portions 48b and 50b of the discharge nozzle 26. Upon a further descent, the holding pawls 48a and 50a are opened against each other by the actions of the semi-annular holding pawls 48a and 50a, the sloping portions 48b and 50b and the upper end of the discharge nozzle 26 so that they move down to the annular groove 52 in the upper end of the discharge nozzle 26. Then, the holding pawls 48a and 50a are fitted in the annular groove 52 by the actions of the springs 54 and 56. As described above, the connecting arm 32 is biased upward, i.e., toward the aforementioned inactive positions by the biasing means 44, so that the semicircular holding pawls 48a and 50a and the upper wall of the annular groove 52 come into firm engagement thereby to ensure the connection of the connecting nozzle 34 to the discharge nozzle 26. The holding means 36 may take any structure, if it can ensure the connection of the connecting nozzle 34 to the discharge nozzle 26.

Figure 3:
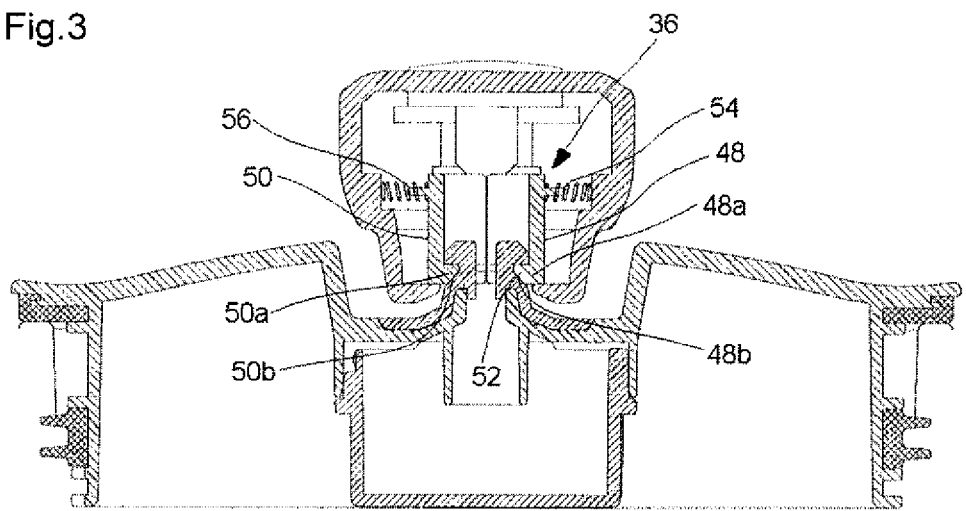
FIG. 3 A section along the line A-A of FIG. 1.
Figure 5:
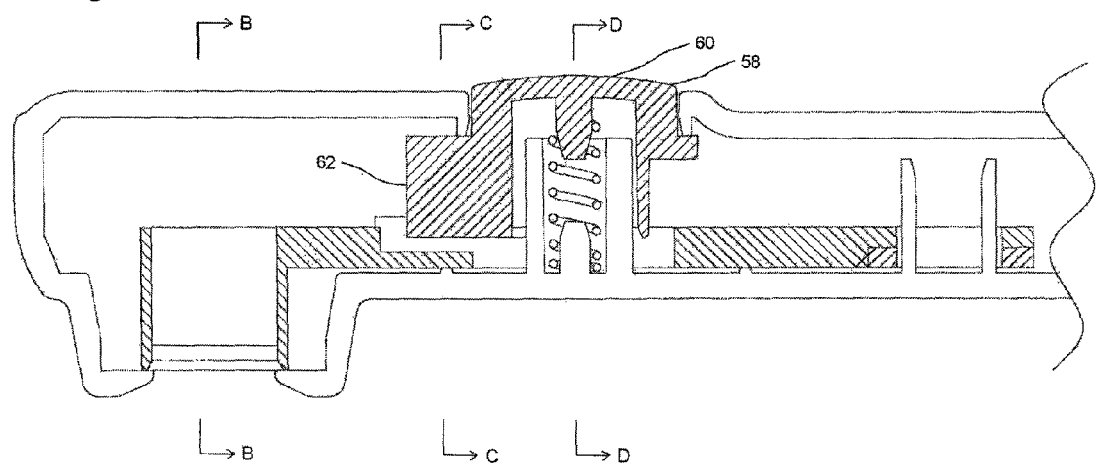
FIG. 5 A vertical section of the leading end portion of the connecting arm with a holding arm being closed.
Figure 6:
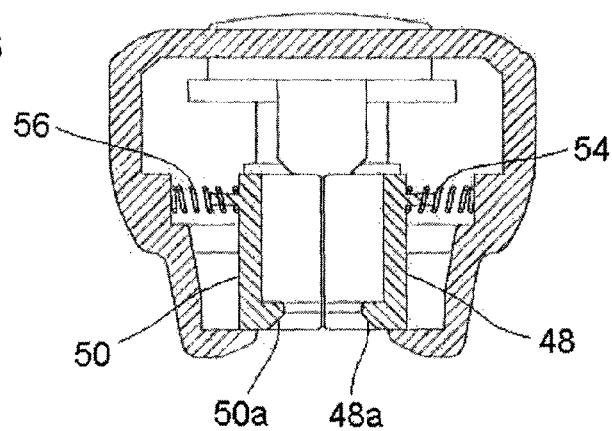
FIG. 6 A section along the line B-B of FIG. 5.
Figure 9:
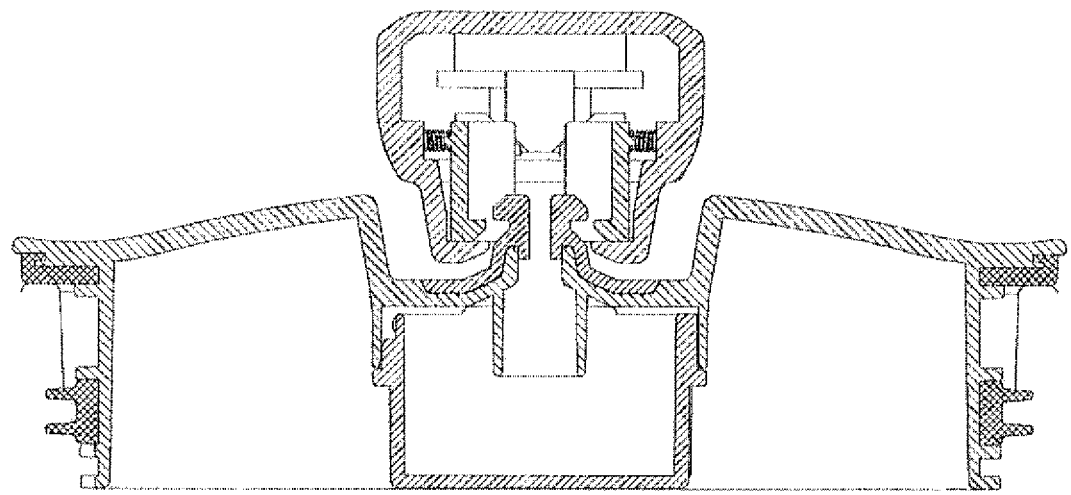
FIG. 9 A view showing the state, in which a pair of holding arms are opened in FIG. 3.

The aforementioned holding means 36 is equipped with releasing means 58 for pivoting the holding arms 48 and 50 from active positions shown in FIG. 3 and so on to inactive positions shown in FIG. 9 and so on. The releasing means 58 is equipped, as shown in FIG. 5 and so on, with a push button portion 60 adapted to be pushed by the operator and a releasing arm 62 arranged in front of the former.

Figure 7:
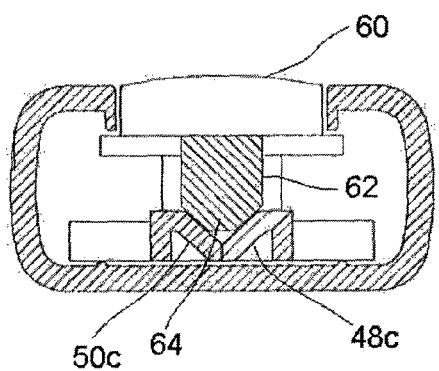
FIG. 7 A section along the line C-C of FIG. 5.
Figure 8:
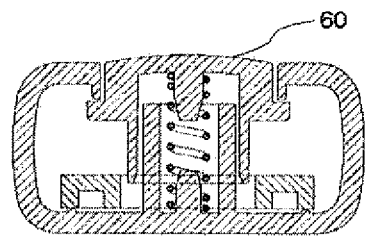
FIG. 8 A section along the line D-D of FIG. 5.

The lower end of the aforementioned releasing arm 62 is exemplified to act as an operation portion 64 having a triangular section, as shown in FIG. 7. On the other hand, the mating portions, which face the operation portion 64, of the holding arms 48 and 50 form together an M-letter shape thereby to form open/close portions 48c and 50c, on which the aforementioned triangular operation portion 64 is to be mounted. In the state shown in FIG. 5 to FIG. 8, the open/close portions 48c and 50c are closed by the actions of the springs 54 and 56. Therefore, the holding pawls 48a and 50a are also closed so that these holding pawls 48a and 50a and the upper wall of the annular groove 52 firmly engage thereby to ensure the connection of the connecting nozzle 34 to the discharge nozzle 26. Here, the push button portion 60 is biased upward by a spring 66 so that the releasing arm 62 is accordingly biased upward, too.

Figure 10:
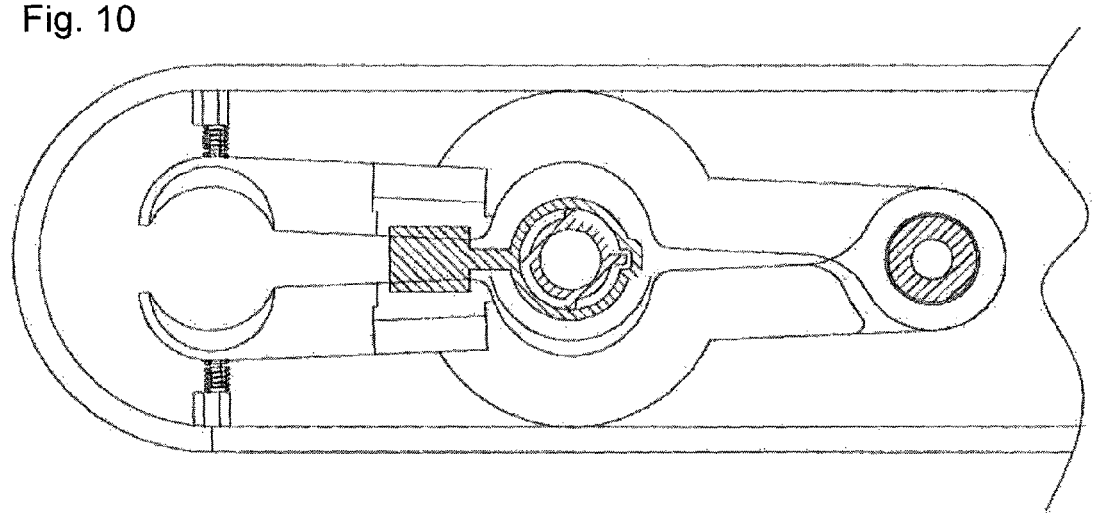
FIG. 10 A horizontal section showing the holding arm in the open state.
Figure 11:
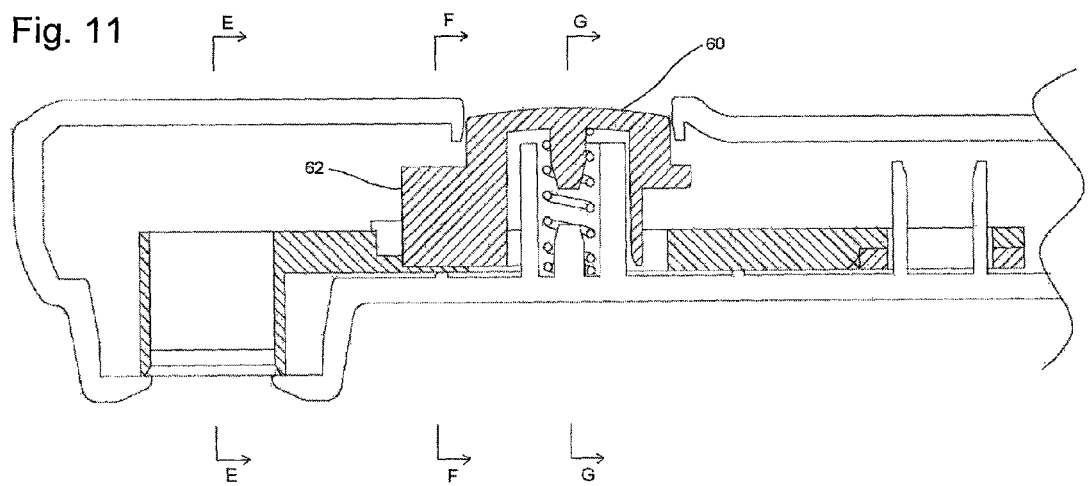
FIG. 11 A vertical section of the leading end portion of the connecting arm, and showing the state, in which the holding arm is closed.
Figure 12:
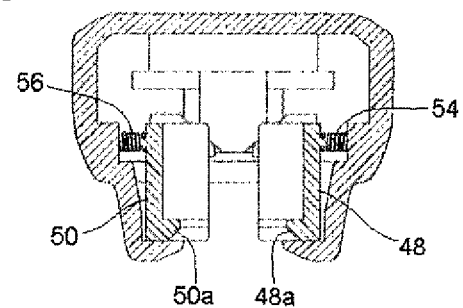
FIG. 12 A section along the line E-E of FIG. 11.
Figure 13:
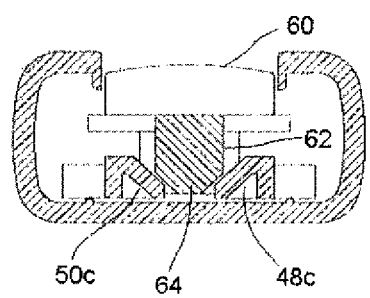
FIG. 13 A section along the line F-F of FIG. 11.
Figure 14:
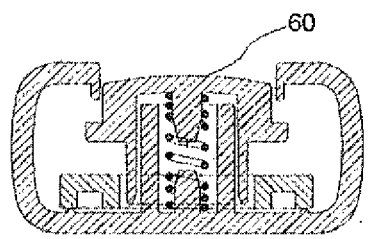
FIG. 14 A section along the line G-G of FIG. 11.

Accordingly as the operator pushes and operates the aforementioned push button portion 60 in the aforementioned state against the spring 66, as shown in FIG. 11 and so on, the releasing arm 62 descends so that the triangular operation portion 64 at the lower end of the releasing arm 62 pushes to expand the open/close portions 48c and 50c of the holding arms 48 and 50, as shown in FIG. 13. As a result, the semi-annular holding pawls 48a and 50a take the open positions, as shown in FIG. 10 and FIG. 12, so that they are released from the connections to the discharge nozzle 26.

When the holding means 36 is thus released from the discharge nozzle 26, the connecting arm 32 is turned to some extent in the direction to an unadopted position by the action of the biasing means 44.

The gas-tightness between the aforementioned connecting nozzle 34 and the aforementioned discharge nozzle 26 is achieved by a sealer 68 disposed at the lower end of the aforementioned connecting nozzle. This sealer may be disposed either at the upper end of the discharge nozzle 26 or at the two nozzles.

Figure 15:
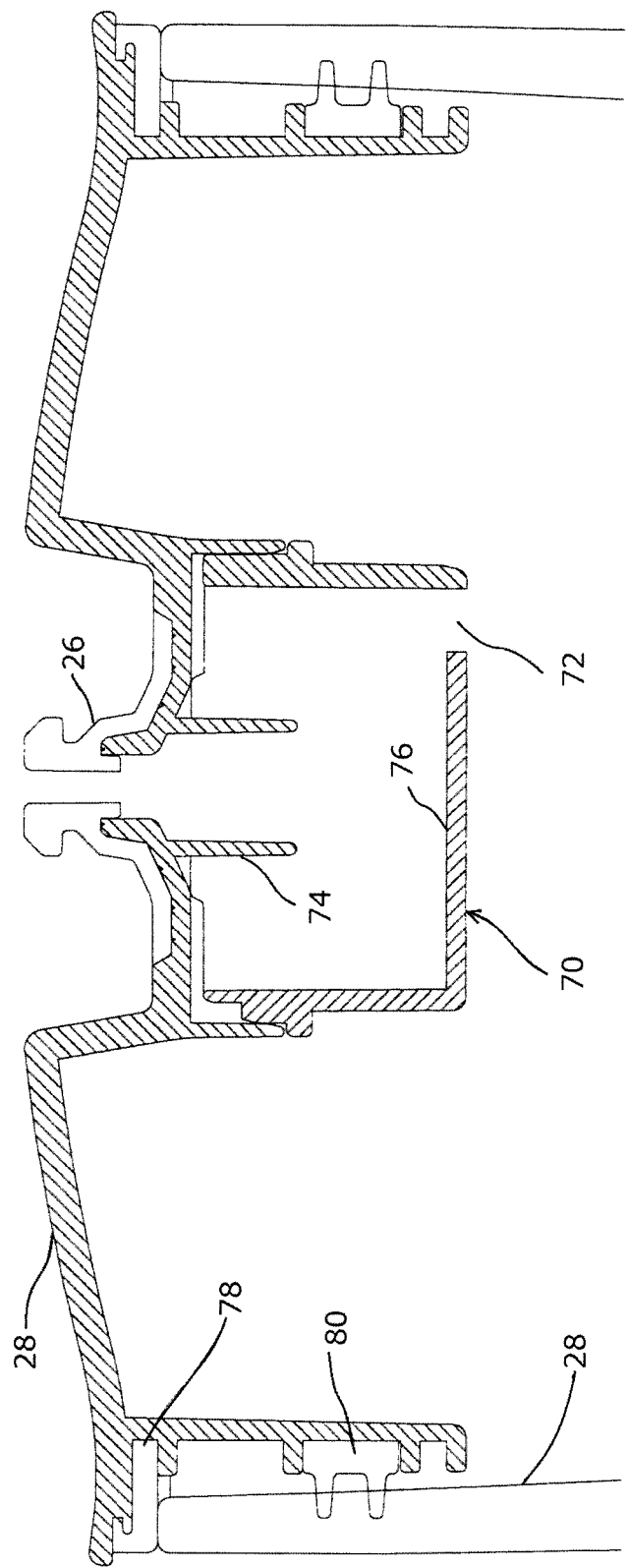
FIG. 15 A longitudinal section for explaining the structure of a cover member 28.

To the lower side of such a portion of the aforementioned cover member 28 as is equipped with the aforementioned discharge nozzle 26, there is removably attached a cup-shaped trap member 70, as shown in FIG. 15. The air flow from the cooker container 20 is adapted to flow toward the discharge nozzle 26 through that trap member 70. In order that the air flow from the cooker container 20 may flow against the lower face of the cover member 28 around the aforementioned discharge nozzle 26, a communication port 72 is formed around the bottom of that trap member 70. Moreover, this trap member 70 is equipped with an air-flow buffering tube 74, which is extended vertically downward for directing the air flow having hit the lower face of the cover member, downward. As a result, the cooking material accompanied by the air flow is received by a receiver 76 of the bottom of the aforementioned trap member. The aforementioned communication port 72 acts, too, as a communication port for returning the material for cooking received by the receiver 76, to the inside of the cooker container 20.

In short, the aforementioned communication port 72 and the air-flow buffering tube 74 constitute air-flow control means for preventing the air flow from going directly to the discharge nozzle. Here, the air-flow control means may also be modified into the structure, in which the air-flow buffering tube 74 is more extended downward than that shown in the drawing and in which the aforementioned communication port 72 is formed in the circumferential wall of the trap member 70 so that the air flow may hit the air-flow buffering tube 74 directly. It is preferred that the lower end of the buffering tube 74 is positioned above the bottom of the aforementioned trap member.

The aforementioned cover member 28 is preferably equipped with sealers 78 and 80 for blocking the air, which might otherwise enter the inside of the cooker container from between said cover member and the upper wall of the cooker container when said cover member is fitted in the cooker container.

The present vacuum electric cooker comprises control means 82 for controlling the aforementioned motor 18 and the aforementioned vacuum pump 38, and pressure-detecting means 84 connected with said control means for measuring the degree of vacuum in the aforementioned cooker container 20. This pressure-detecting means 84 measures the degree of vacuum in the air tube 40 thereby to measure the degree of vacuum in the cooker container 20. Here, the pressure detecting means is desirably a pressure sensor but may be a pressure switch.

At the start of the vacuum electric cooker 10, (the operator turns on the switch), the aforementioned control means 82 operates at first the aforementioned vacuum pump 38 to evacuate the inside of the cooker container 20. When the degree of vacuum in the cooker container 20 becomes a first predetermined vacuum degree A, the aforementioned pressure detecting means 84 transmits a predetermined vacuum degree achievement signal SA to the aforementioned control means 82, so that the aforementioned control means 82 having received that signal stops the aforementioned vacuum pump and starts the aforementioned motor. The aforementioned pressure detecting means 84 transmits a vacuum degree drop signal SB to the aforementioned control means when the degree of vacuum in the cooker container lowers during the action of the aforementioned motor to a second predetermined vacuum degree lower than the aforementioned first predetermined vacuum degree. In response to that vacuum degree drop signal SB, the aforementioned control means 82 actuates the aforementioned vacuum pump 38 thereby to raise the vacuum degree of the aforementioned cooker container 20 to the aforementioned first predetermined vacuum degree A. At this time, the aforementioned motor 18 remains active.

Figure 16:
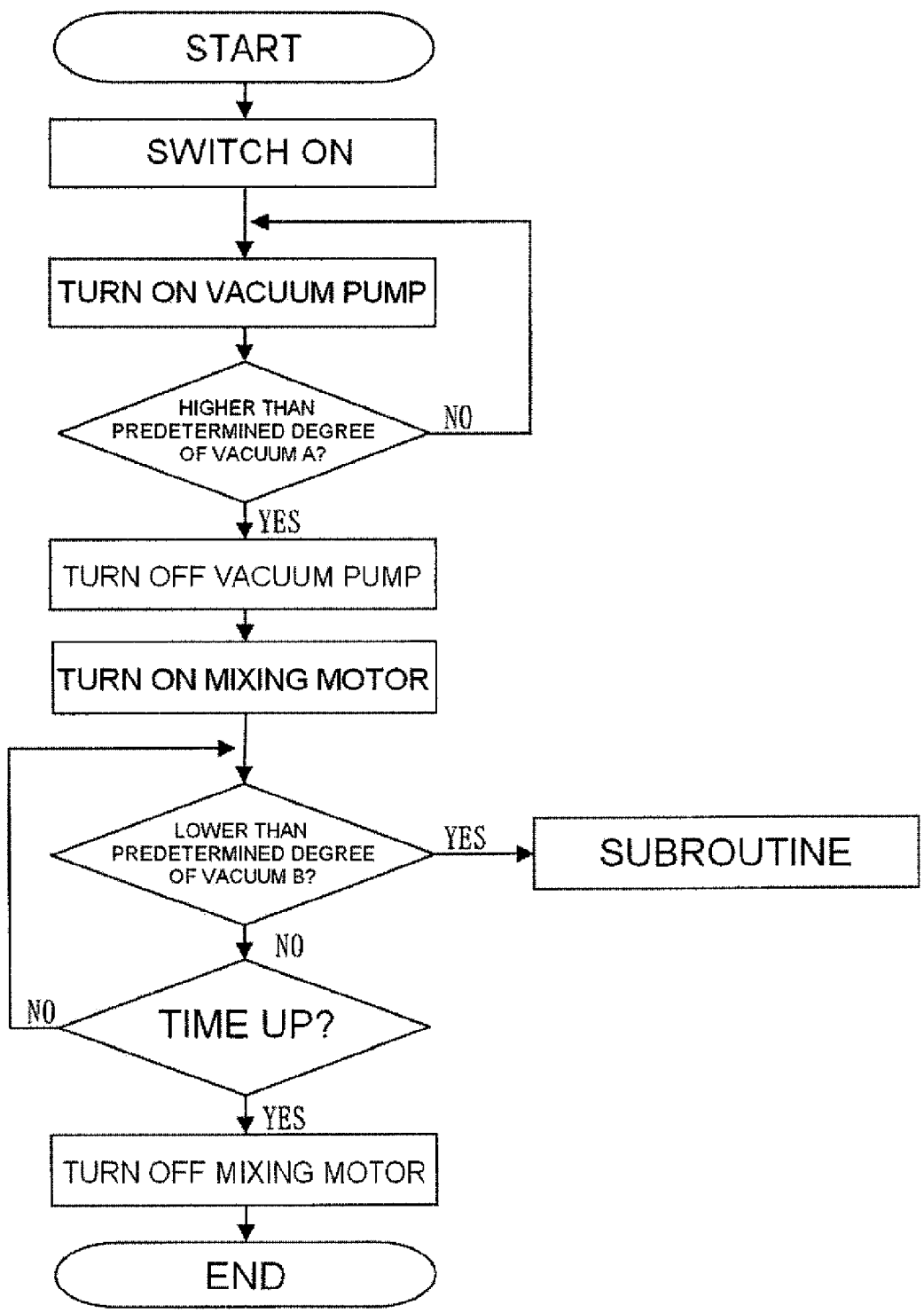
Figure 17:
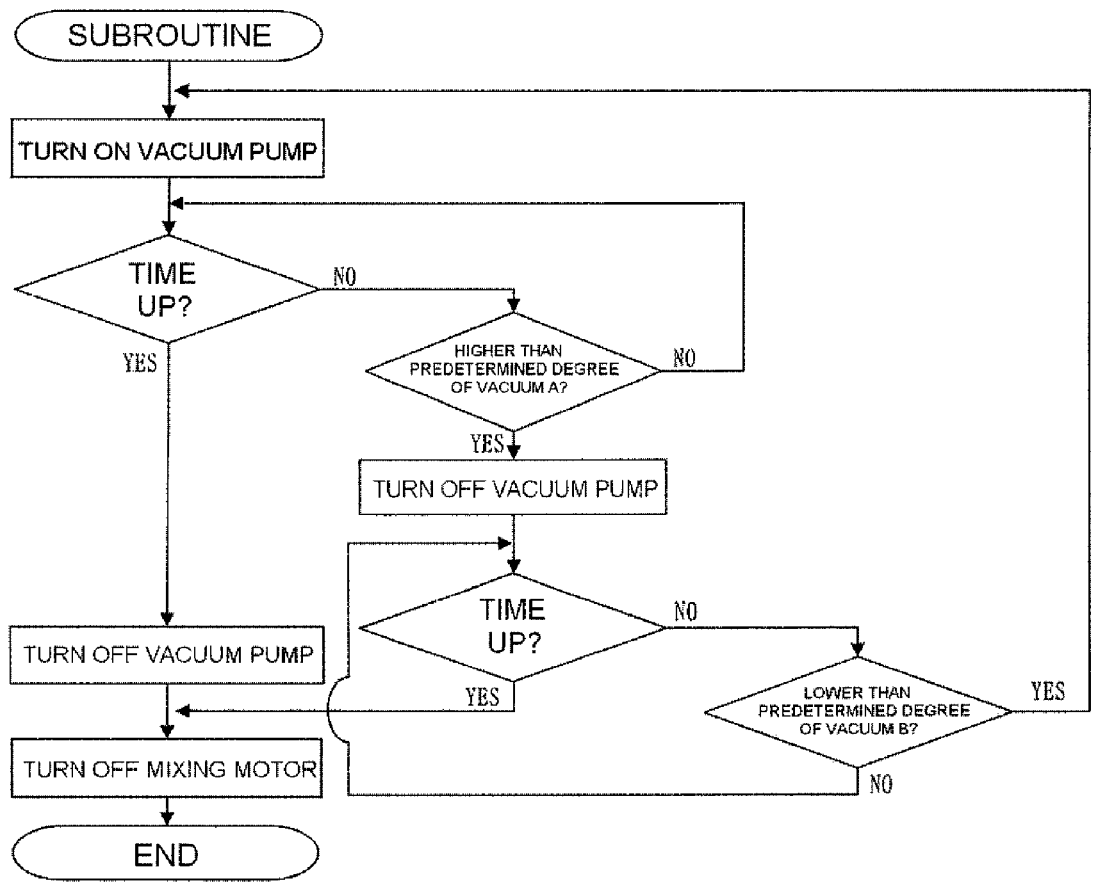
FIG. 17 A flow chart of a subroutine of the main routine for showing the operation control of the vacuum electric cooker shown in FIG. 16.

The present vacuum electric cooker includes a (not-shown) timer, which transmits, after lapse of a preset (sufficient) cooking time period, a cook ending signal indicating the lapse of the preset time period, to the aforementioned control means 82. This control means 82 stops the aforementioned motor 18 when it receives the aforementioned cooking end signal. At this time, the control means 82 stops the action of the vacuum pump 38 when this vacuum pump 38 is active. A specific example of the control thus far described is illustrated in FIG. 16 and FIG. 17.

Incidentally, it is preferred that the aforementioned first predetermined vacuum degree A is 10 KPa abs. or less, especially 18 KPa abs. or less, and that the aforementioned second predetermined vacuum degree B is 14 KPa abs. or less, especially 22 KPa abs. or less, and it is preferred that the second predetermined vacuum degree B is lower by about 4 KPa than the first predetermined vacuum degree A.

Figure 18:
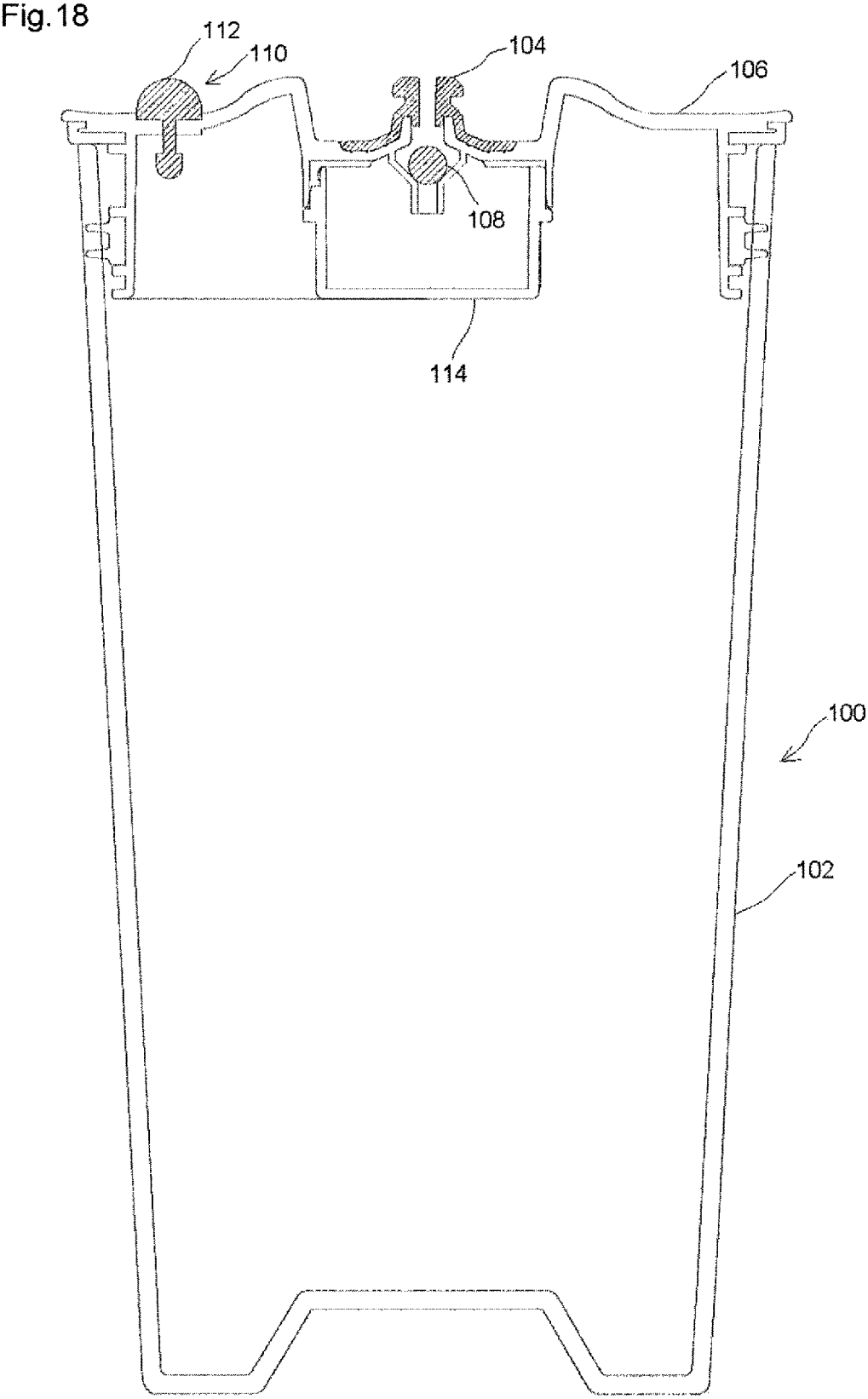
FIG. 18 A longitudinal section for explaining the structure of a vacuum-preservation container.
Figure 19:
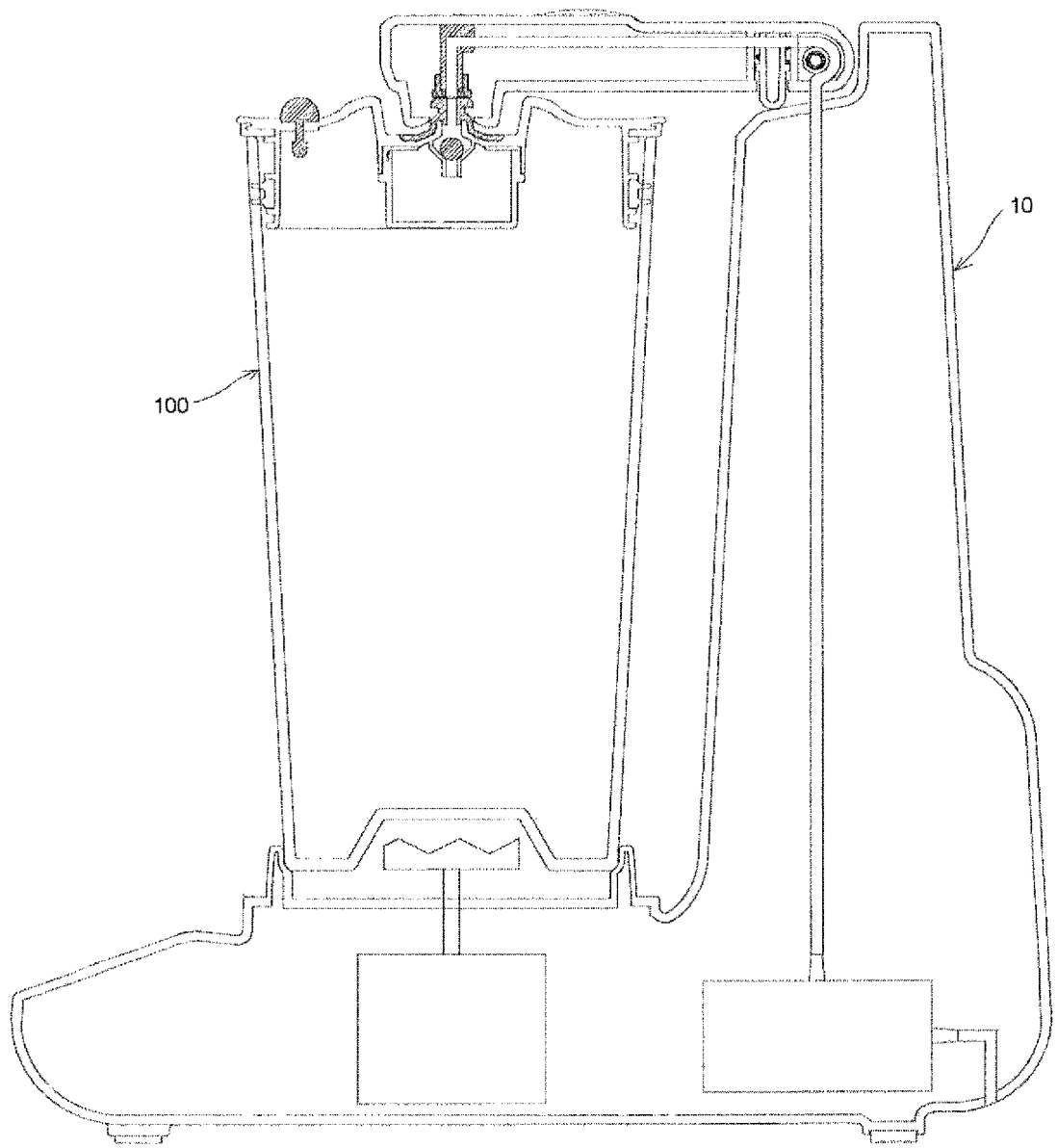
FIG. 19 A drawing showing the state, in which the vacuum-preservation container shown in FIG. 18 is mounted in a cooker body.

It is preferred that the present vacuum electric cooker is provided with a vacuum-preservation container 100 shown in FIG. 18. This vacuum-preservation container 100 includes: a vacuum-preservation container body 102 having substantially the same structure as that of the aforementioned cooker container body 24, excepting the absence of the disposition of the cooking tool 22; and a preservation container cover 106 having a discharge nozzle 104 of a structure similar to that of an evacuation vacuum nozzle of the aforementioned cover member 28. To the discharge nozzle 104, there is connected a check valve 108 for allowing an air flow only from the vacuum-preservation container body 102 to the discharge nozzle 104. The aforementioned vacuum-preservation container 100 is made to have such a height that its discharge nozzle can be hermetically connected to the connection nozzle of the aforementioned connecting arm when the container 100 is placed on the horizontal base portion of the aforementioned cooker body with the cover 106 being placed on the aforementioned vacuum-preservation container body 102, so that the container 100 can be evacuated by the cooker body 12 like the cooker container 20 (as referred to FIG. 19).

This vacuum-preservation container 100 is enabled to keep the vacuum of the inside by the aforementioned check valve 108 even after it has been removed from the connecting arm 32 or accordingly from the cooker body 12.

The aforementioned preservation container cover 106 is equipped with gas-tightness releasing means 110 for releasing the gas tightness in the vacuum-preservation container 100 by the operation of the operator. This gas-tightness releasing means 110 may be made such that a portion of the preservation container cover 106 is opened to release the gas-tightness of the vacuum-preservation container 100 when a push button 112 is pushed by the operator. Here, the gas-tightness releasing means 110 may be of the type, in which it is operated when a pull member is pulled by the operator. Moreover, this preservation container cover 106 is provided with a trap member 114 having a structure similar to that of the trap member 70 which is removably mounted in the cover member 28.

Figure 20:
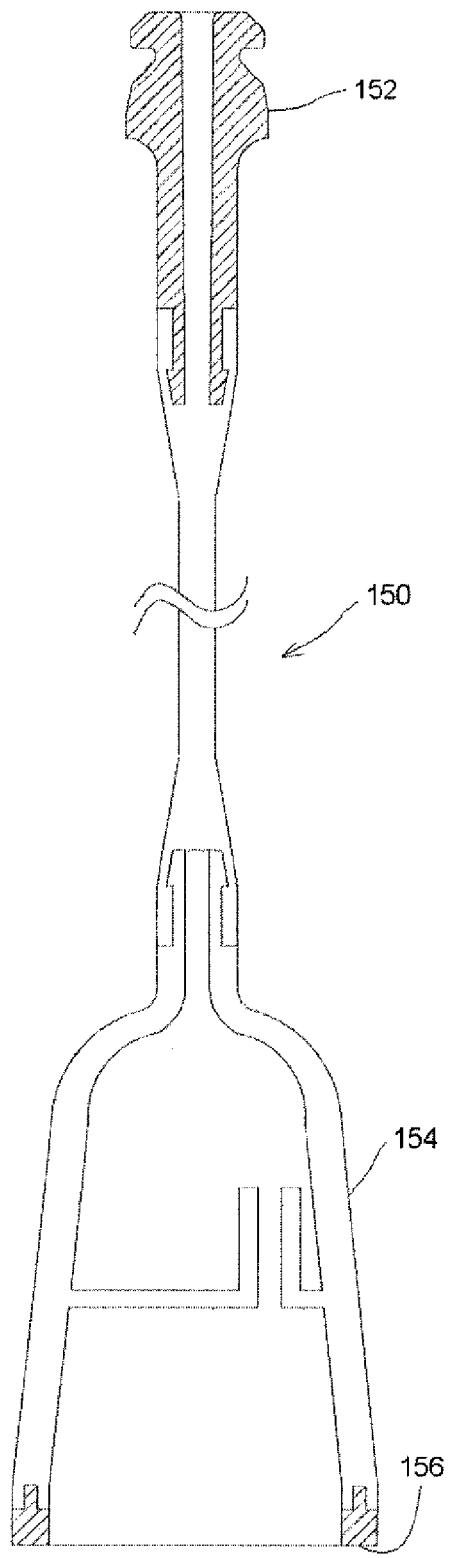
FIG. 20 A section for explaining the structure of an accessory vacuum tube.

The present vacuum electric cooker may comprise an accessory vacuum tube 150 for evacuating the inside of a vacuum-preservation container or a vacuum-preservation bag having a structure different from that of the aforementioned vacuum-preservation container 100 (as referred to FIG. 20). This accessory vacuum tube 150 is equipped at its one end with an evacuation vacuum nozzle 152 having a structure similar to that of the evacuation vacuum nozzle 26 of the aforementioned cover member 28. This evacuation vacuum nozzle 152 can be mounted and demounted like the connecting nozzle 34 of the connecting arm 32 and the discharge nozzle 26 of the cover member 28. The aforementioned accessory vacuum tube 150 is equipped at its other end with a sucking attachment 154.

The aforementioned sucking attachment 154 is equipped with a wide vacuum port, and a trap member 156 disposed above the vacuum port and having a structure like that of the trap member 70 to be removably mounted on the cover member 28.

Figure 21:
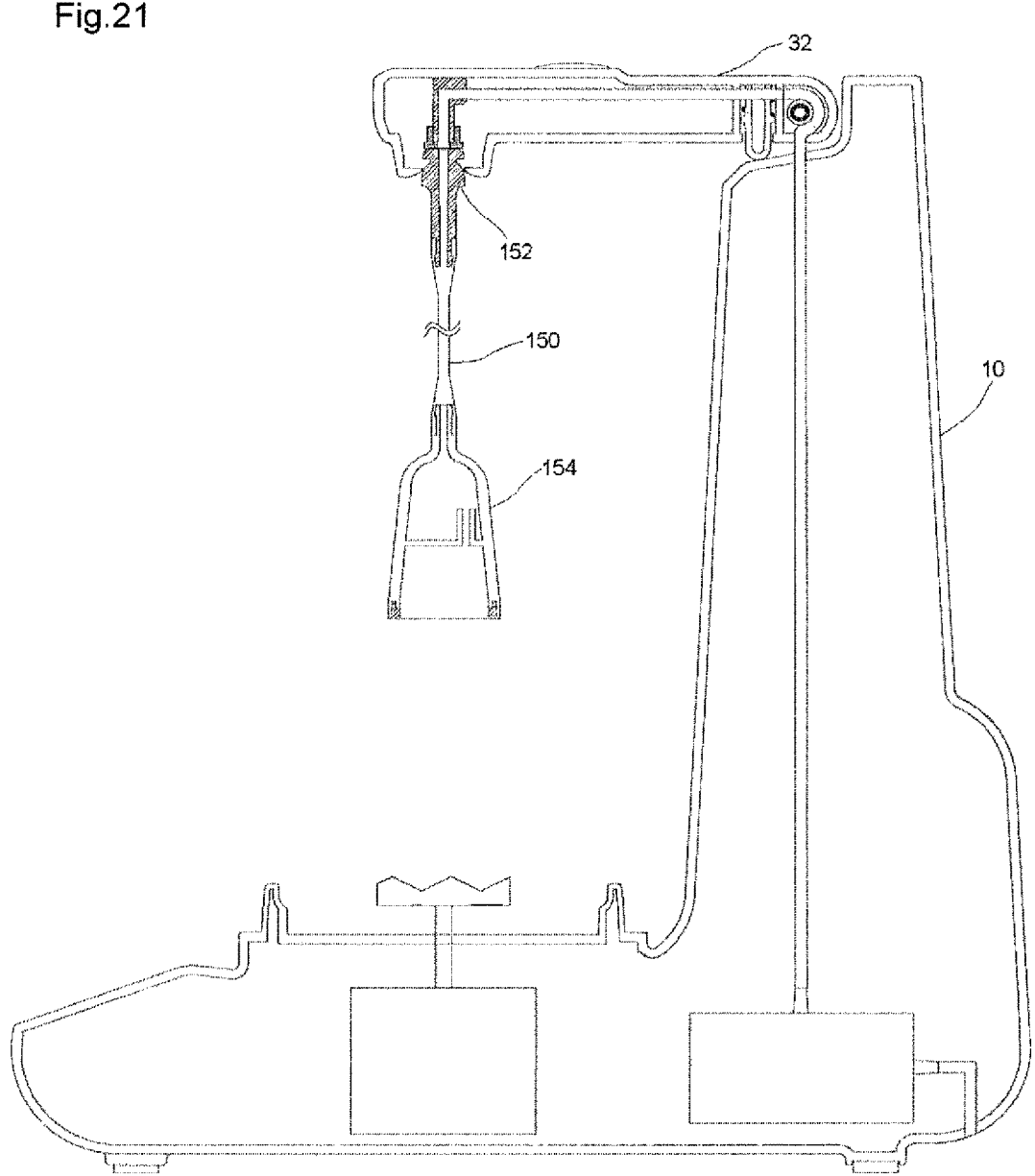
FIG. 21 A diagram for explaining the state, in which the accessory vacuum tube shown in FIG. 20 is connected to the connecting arm of the cooker body.
Figure 22:
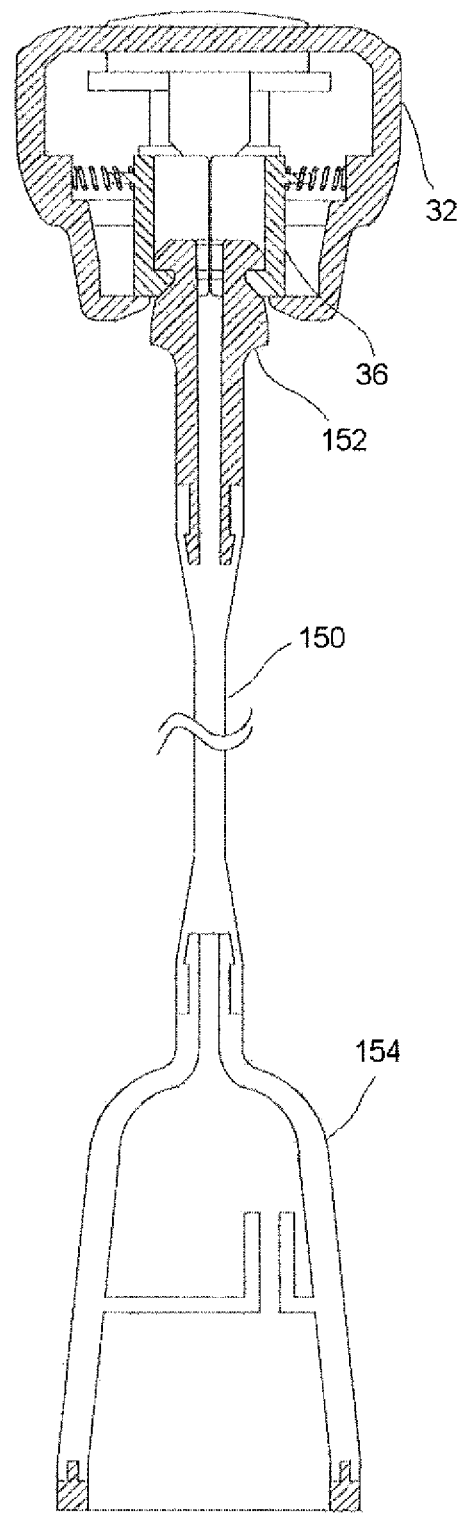
FIG. 22 A diagram showing the state, in which the holding means arranged in the connecting arm is in an active position.
Figure 23:
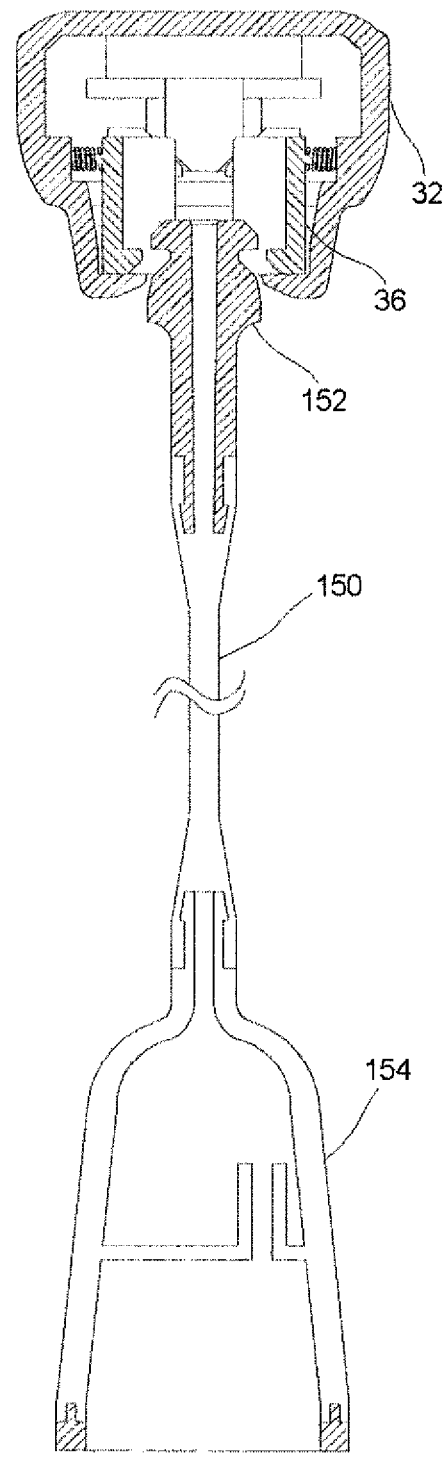
FIG. 23 A diagram showing the state, in which the holding means arranged in the connecting arm is in an inactive position.

This accessory vacuum tube 150 is attached, as shown in FIG. 21, to the connecting arm 32 of the cooker body 12 so that it sucks with the action of the vacuum pump 38. FIG. 22 is a diagram showing, in an enlarged scale, the state, in which the accessory vacuum tube 150 is connected to the connecting arm 32.

The present vacuum electric cooker can be used as a juicer, a mixer, a mill mixer, a food processor or the like.

DESIGNATIONS OF REFERENCE NUMERALS

10 Vacuum Electric Cooker
12 Cooker Body
14 Horizontal Base
16 Stand Section
18 Motor 20 Cooker Container
22 Cooking Tool
24 Cooker Container Body
26 Discharge Nozzle
28 Cover Member
30 Container Base
32 Connecting Arm
34 Connecting Nozzle
36 Holding Means
38 Vacuum Pump
40 Air Tube
42 Spring
44 Biasing Means
46 Pivot
48 Holding Arm
48a Holding Pawl
48b Sloping Portion
48c Open/Close Portion
50 Holding Arm
50a Holding Pawl
50b Sloping Portion
50c Open/Close Portion
52 Annular Groove
54 Spring
56 Spring
58 Releasing Means
60 Push Button Portion
62 Releasing Arm
64 Operation Portion
66 Spring
68 Sealer
70 Trap Member
74 Air-Flow Buffering Tube
76 Receiver
78 Sealer
80 Sealer
82 Control Means
84 Pressure-Detecting Means
100 Vacuum-Preservation Container
102 Vacuum-Preservation Container Body
104 Discharge Nozzle
106 Preservation Container Cover
108 Check Valve
110 Air-Tightness Releasing Means
112 Push Button
114 Trap Member
150 Accessory Vacuum Tube
152 Evacuation Vacuum Nozzle
154 Suction Attachment
156 Trap Member

What is claimed is:

1. A vacuum electric cooker comprising: a cooker body including a horizontal base and a stand section extending vertically upward from the rear edge of that horizontal base and having a motor mounted therein; a cooker container including a cooking tool adapted to be driven by said motor, and removably mounted on the horizontal base of said cooker body; a cover member having an discharge nozzle for covering said cooker container; a connecting mechanism configured to be connected to the vicinity of the upper end of said stand section as to be displaceable between an active position and an inactive position; a connecting nozzle attached to said connecting mechanism and connected air-tightly to said discharge nozzle when said connecting mechanism is at the active position; a holding mechanism configured to hold the state, in which said connecting nozzle is hermetically connected to said discharge nozzle; a vacuum pump disposed in said cooker body; and an air tube connected at one end to said vacuum pump, extending therefrom within the stand section and the connecting mechanism and connected at the other end to said connecting nozzle.

2. A vacuum electric cooker as set forth in claim 1, wherein said connecting arm is biased in the direction to said inactive position by a spring.

3. A vacuum electric cooker as set forth in claim 1, wherein said holding mechanism is arranged in said connecting mechanism.

4. A vacuum electric cooker as set forth in claim 1, wherein releasing mechanism adapted to be operated by an operator for releasing the active state of said holding mechanism is mounted on said connecting mechanism.

5. A vacuum electric cooker as set forth in claim 1, wherein a sealer mounted on the lower end of said connecting nozzle and/or the upper end of said discharge nozzle assures a tight fit between said connecting nozzle and said discharge nozzle.

6. A vacuum electric cooker as set forth in claim 1, further comprising a trap member having a cup shape and removably attached to the lower side of that portion of said cover member, which is equipped with said discharge nozzle, so that the air flow from the cooker container flows through that trap member to the side of the discharge nozzle, wherein said trap member is equipped with air-flow control unit for preventing the air flow from proceeding directly toward the discharge nozzle, so that a cooking material accompanied by the air flow may be received on the bottom of said trap member.

7. A vacuum electric cooker as set forth in claim 6, wherein the air-flow control unit includes: a communication port formed in the bottom of said trap member for causing the air flow from the cooker container to hit the lower face of the cover member around said discharge nozzle; and an air-flow buffering tube extending vertically downward from the lower face of said cover member around the arranged portion of said discharge nozzle, for preventing the air flow having hit the lower face of said cover member from going directly to the discharge nozzle.

8. A vacuum electric cooker as set forth in claim 1, wherein said cover member includes a sealer for blocking the entry of air into the cooker container, when said cover member is mounted on the cooker container, from between said cover member and the upper wall of the cooker container.

9. A vacuum electric cooker as set forth in claim 1, further comprising: control unit configured to control said motor and said vacuum pump; and pressure detecting unit connected with said control unit for metering the degree of vacuum in said cooker container, wherein said control unit activates said vacuum pump firstly at the start of the vacuum electric cooker, to evacuate the inside of the cooker container, wherein said pressure detecting unit sends a predetermined vacuum degree achievement signal to said control unit, when the vacuum degree in the cooker container reaches a predetermined vacuum degree, so that said control unit having received said signal stops said vacuum pump and starts said motor, wherein said pressure detecting unit sends a vacuum drop signal to said control unit, when the vacuum degree in the cooker container drops, during the action of said motor, to a second predetermined vacuum degree lower than said first predetermined vacuum degree, and wherein said control unit having received said vacuum degree drop signal activates said vacuum pump thereby to raise the vacuum degree of said cooker container to said first predetermined vacuum degree.

10. A vacuum electric cooker as set forth in claim 1, further comprising a vacuum-preservation container including a vacuum-preservation container body; and a preservation container cover having a discharge nozzle of a structure similar to that of the discharge nozzle of said cover member, wherein a check valve for passing the air flow only from the vacuum-preservation container body toward the discharge nozzle is connected to the discharge nozzle, and wherein said vacuum-preservation container is made so high that the discharge nozzle thereof can be hermetically connected to the connecting nozzle of said connecting mechanism when placed on the horizontal base of said cooker body while the cooker container cover is placed on the horizontal base of said cooker boy while the cooker container cover is placed on said vacuum-preservation container.

11. A vacuum electric cooker as set forth in claim 10, wherein said preservation container cover includes air-tightness releasing mechanism for releasing the gas-tightness in the vacuum-preservation container by the operation of the operator.

12. A vacuum electric cooker as set forth in any claim 1, further comprising an accessory vacuum tube provided at its one end with an discharge nozzle having a structure similar to that of the discharge nozzle of said cover member.

13. A vacuum electric cooker as set forth in claim 12, wherein said accessory vacuum tube is provided at its other end with a connecting nozzle having a structure similar to that of the connecting nozzle of said connecting mechanism.

14. A vacuum electric cooker as set forth in claim 1, wherein said connecting mechanism has a base end so attached to the vicinity of the upper end of said stand section as to rock in a vertical plane between substantially horizontal said active position and substantially vertical said inactive position.

* * * * *